Sept. 6, 1960

J. F. JOY 2,951,307

APPARATUS FOR OFFSHORE FISHING

Filed April 25, 1955

INVENTOR:
JOSEPH F. JOY

ATTORNEY

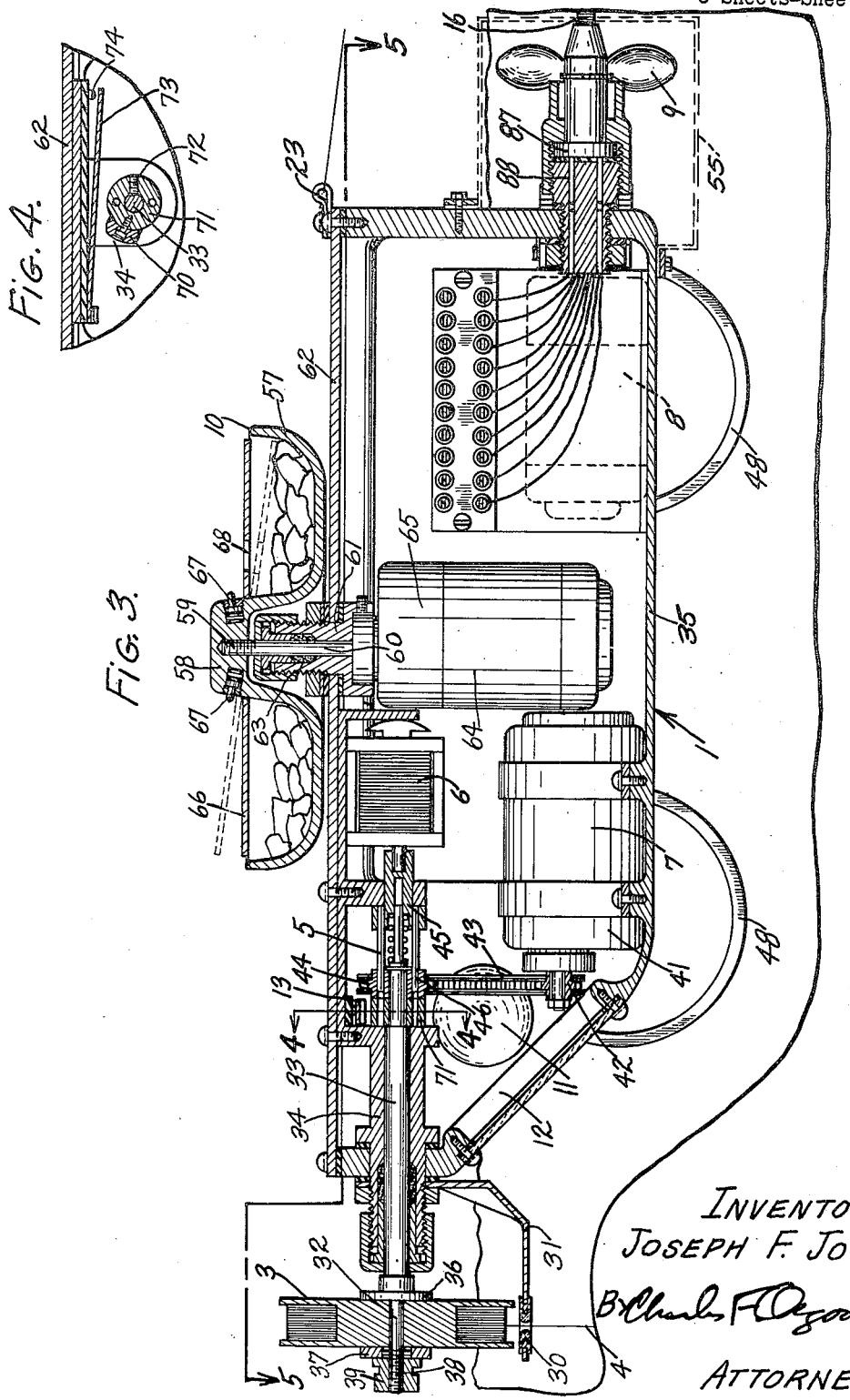

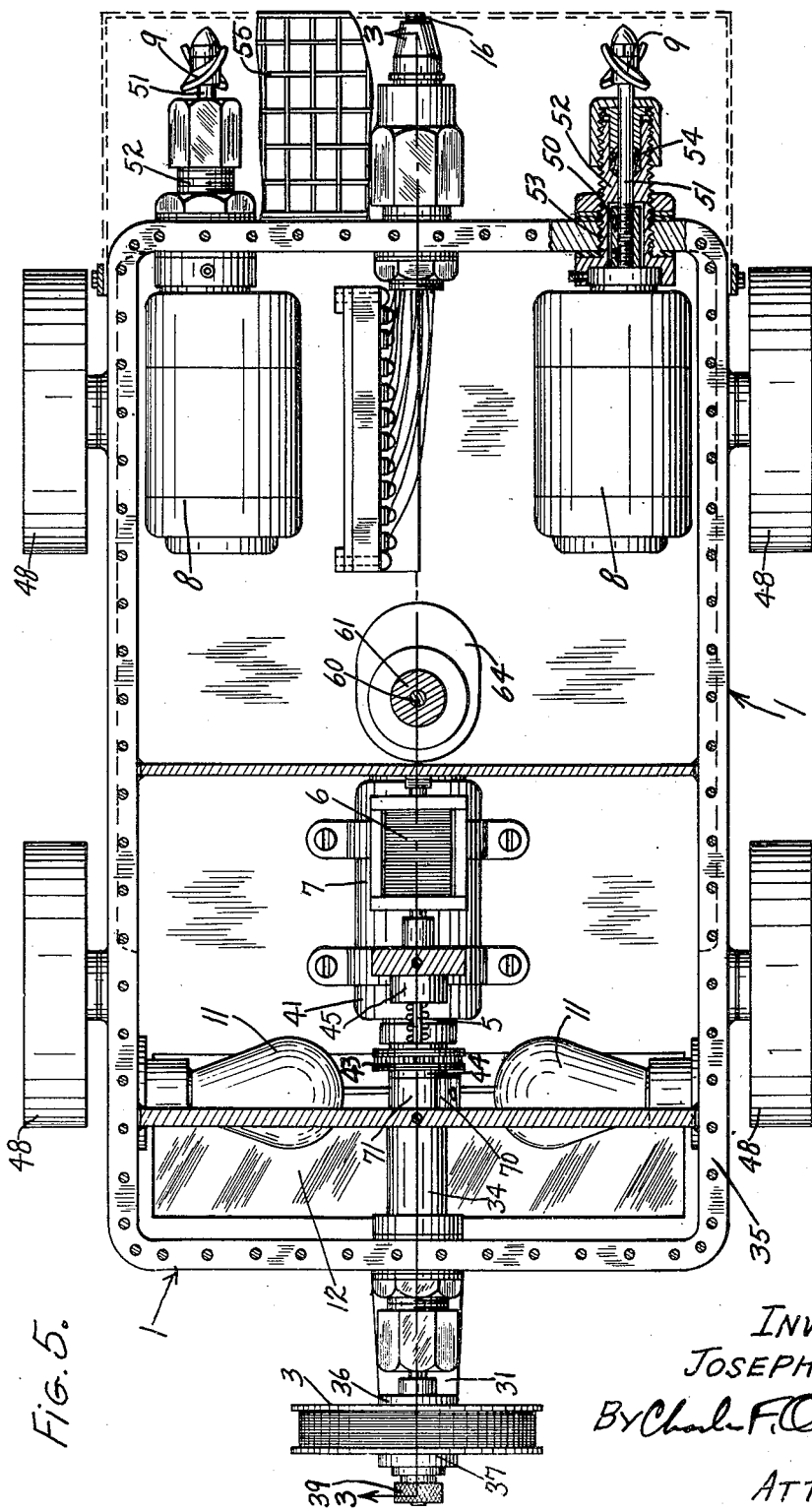

Sept. 6, 1960 J. F. JOY 2,951,307
APPARATUS FOR OFFSHORE FISHING
Filed April.25, 1955 5 Sheets-Sheet 4
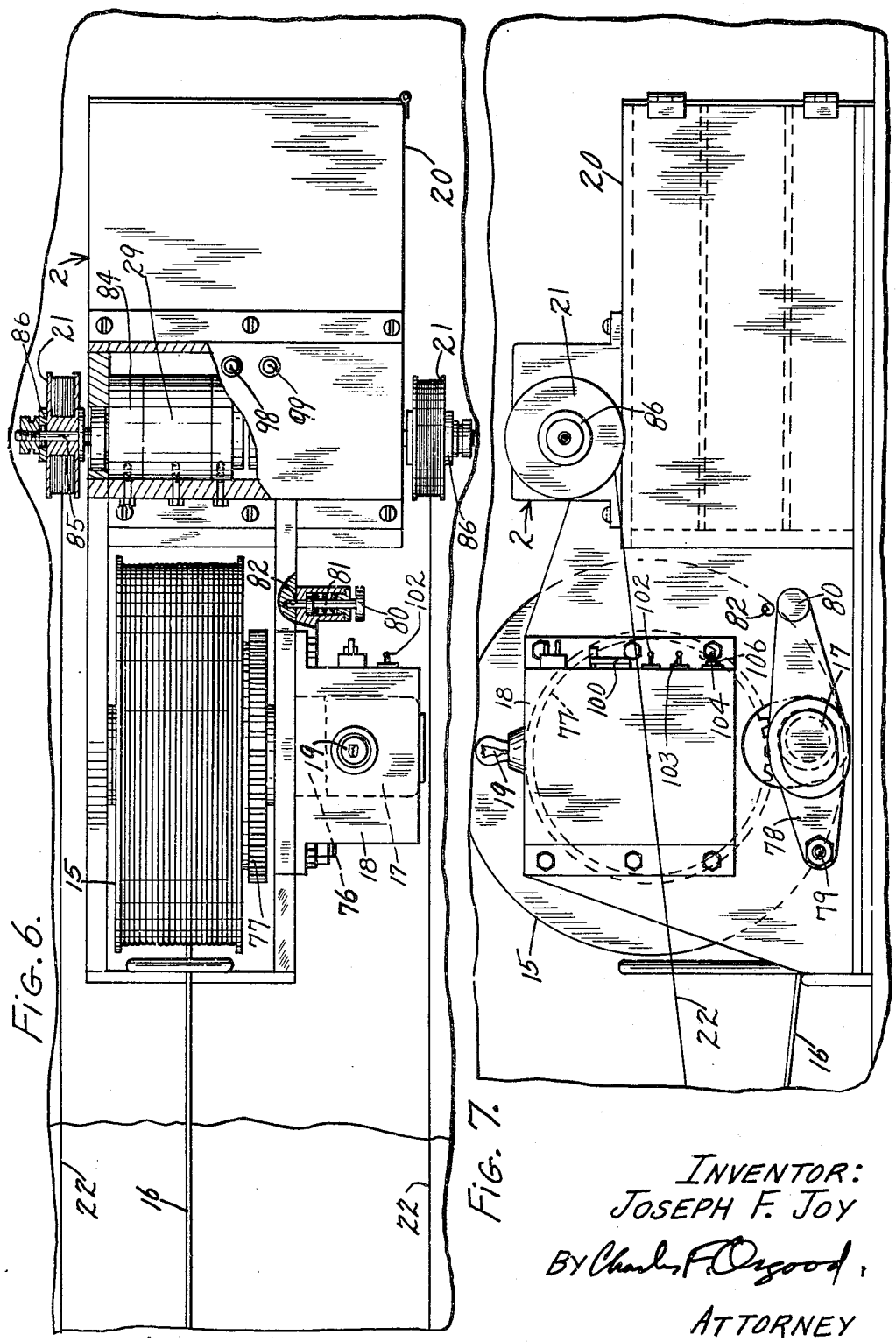
INVENTOR:
JOSEPH F. JOY
BY Charles F. Osgood,
ATTORNEY

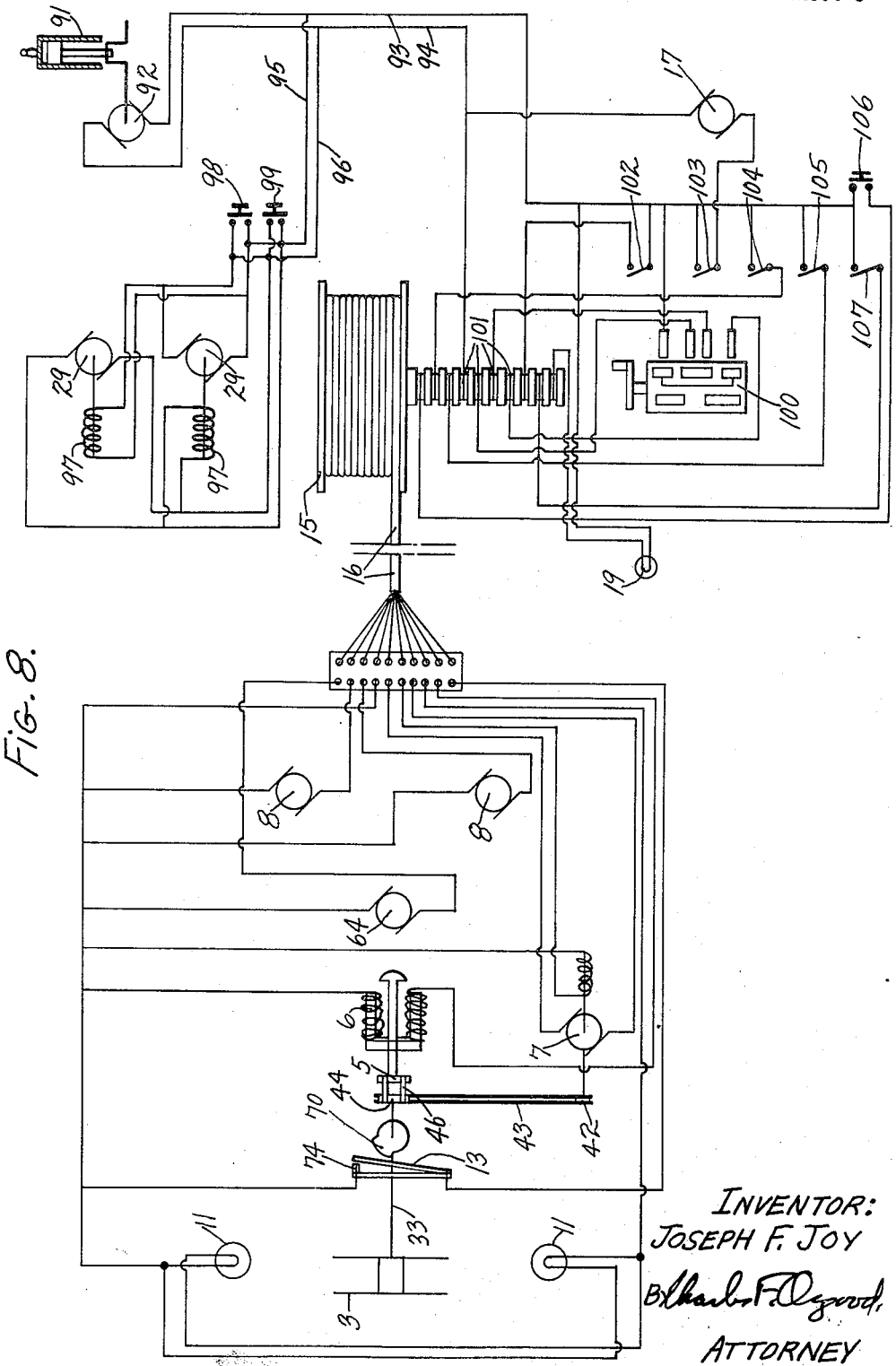

United States Patent Office 2,951,307
Patented Sept. 6, 1960

2,951,307

APPARATUS FOR OFFSHORE FISHING

Joseph F. Joy, Comanche and Iroquois Roads, Brookside Farms, Pittsburgh 28, Pa.

Filed Apr. 25, 1955, Ser. No. 503,440

12 Claims. (Cl. 43—26.1)

This invention relates to fishing apparatus and more particularly to apparatus by means of which fishing may be effected in relatively deep waters at points remote from the shore and yet fully controlled from the shore.

Ofttimes a fisherman on shore may desire to have his line a considerable distance from the shore, at a distance much greater than a line can ordinarily be cast. Since a boat is not at all times available and due to the relatively bulky equipment necessary with a power boat which may not readily be transported to the place of fishing, the range of fishing at any particular location where the waters are relatively deep is therefore necessarily limited to the normal casting range from the water's edge. The present invention contemplates improvements over known types of equipment for offshore fishing in relatively deep waters in that the line may be carried out a considerable distance from the shore, far out beyond the normal casting range from the water's edge, while the fisherman may at all times have control of the line from his station on shore. The equipment of the present invention is relatively compact, capable of transportation within the trunk of a conventional automobile and may be substituted for the conventional fisherman's boat, outboard motor and boat trailer such as is commonly employed by fishermen.

An object of the present invention is to provide an improved apparatus for offshore fishing in relatively deep waters at considerable distances from the fisherman's station on shore while the line is at all times controlled from the shore. Another object is to provide an improved apparatus by means of which offshore fishing operations may be carried on over a relatively large body of deep water from a single station on shore. A further object is to provide an improved shore control station adapted completely to control the offshore portion of the fishing apparatus. A still further object is to provide improved means embodied in a shore control station whereby the course of the offshore portion of the apparatus may be directed over any desired course. Yet another object is to provide an improved offshore fishing float which may be directed over any desired course under the control of means located on shore. Still another object is to provide improved means for controlling the depth of the fishing lure in the water so as to coordinate its position with the habitats of the fish. A still further object is to provide an improved signaling apparatus that will indicate the depth of the line in the water, the distance to which a striking fish may withdraw the fishing line from the reel, and the distance and rate at which a fish might be retrieved by the reel-winding apparatus. Still another object of the invention is to provide improved means whereby trolling operations may be carried on through a relatively wide range over selected stretches of fishing waters. A further object is to provide an improved chumming device for a fishing apparatus. Yet another object is to provide an improved offshore float having anchoring means controlled from the shore. These and other objects and advantages of the invention will, however, hereinafter more fully appear.

In the accompanying drawings there is shown for purposes of illustration one form which the invention may assume in practice.

In these drawings:

Fig. 3 is an enlarged central longitudinal vertical section taken through the offshore fishing float.

Fig. 4 is a detail vertical section taken on line 4—4 of Fig. 3.

Fig. 5 is a horizontal section, with parts shown in plan, taken on line 5—5 of Fig. 3.

Fig. 6 is a fragmentary plan view of a portion of the inshore element or control station, showing the reels for the power cable and trolling lines.

Fig. 7 is a side view of the inshore element or control station shown in Fig. 6.

Fig. 8 is an electrical wiring diagram showing the improved control system.

Figure 1:
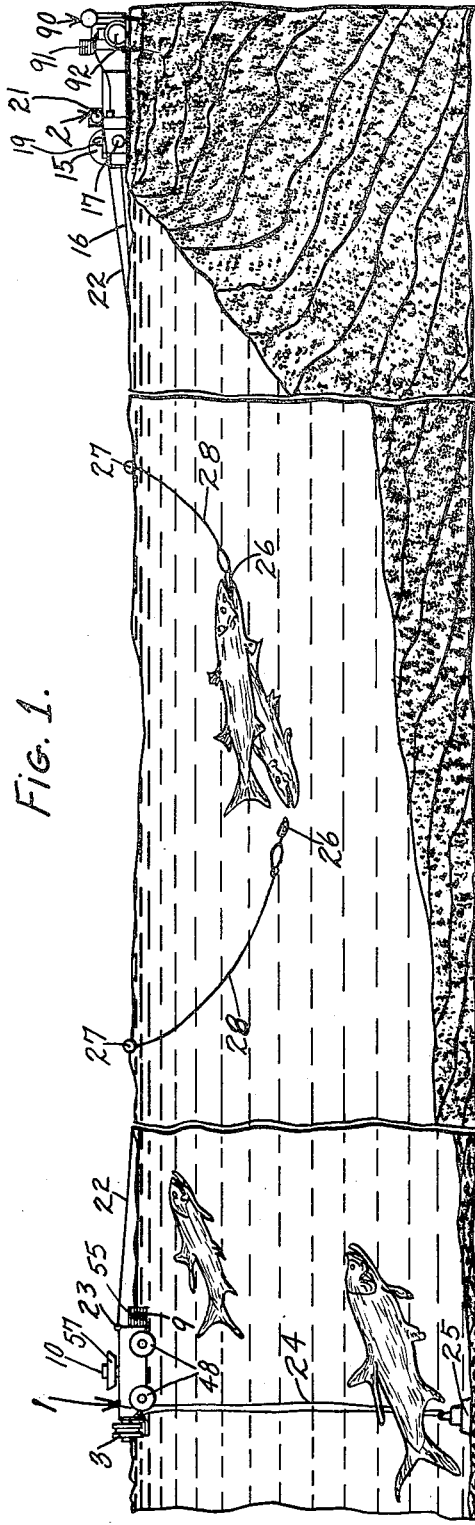
Fig. 1 is a side view and Fig. 2 is a plan view of fishing apparatus constructed in accordance with a preferred illustrative embodiment of the invention, showing the same in operating position with respect to an expanse of water.

The improved fishing apparatus of the present invention consists of two principal elements or units, namely, a floating or buoyant portion generally designated 1 adapted to ride upon the water, which will hereinafter be referred to as the offshore element, and a control station generally designated 2 located on the shore for the purpose of controlling the offshore element and hereinafter referred to as the inshore element.

The offshore or floating element generally comprises a hull having a fishing reel 3 located at the bow thereof and on which a fishing line 4 is wound, a suitable electric motor drive 5 for the reel, an electric solenoid-operated clutch 6 for the convenient engagement and disengagement of the reel driving motor 7 with the reel, a pair of propelling motors 8 driving propellers 9 located at the stern of the float equidistantly spaced at each side thereof, and a motor operated "chumming" device 10 to throw out bait for the purpose of enticing fish to the area over which the float is being operated for fishing purposes. The hull of the float also contains suitable lighting members 11 arranged to light the waters beneath the float through a transparent sealed opening 12 in the bottom of the float near the front, and a circuit-interrupting switch 13 used for the purpose of indicating each revolution the fishing reel turns either during unwinding or winding up of the fishing line.

The inshore element or control station 2 generally comprises a cable reel 15 on which a flexible power conductor and control element in the form of a cable or conductor 16 is wound, a motor 17 for driving the cable reel, switches and control apparatus 18 for the control of the offshore float, and an indicating signal, desirably in the form of a lamp 19, which flashes once for each revolution of the fishing reel 3 on the float so that the amount of line being payed out or wound in may be determined. The control station also includes a cabinet portion 20 containing suitable receptacles such as sliding drawers for the storage of fish lures, lines, hooks, sinkers and the like. The control station also embodies two motor driven fishing reels 21 with fishing lines 22 wound thereon arranged to be passed through suitable guides such as eyelets 23 attached to the offshore float and tied together whereby they may be carried out by the float as the latter is propelled under control from the shore station. The last-described apparatus is used for trolling and for such use the offshore float may be equipped with an anchor line 24 wound on the reel 3 in place of the fishing line above referred to. In use, the offshore float may be operated over the water to a desired point, and the anchor 25 attached to the anchor line may then be lowered so as to cause the offshore float to remain in a relatively fixed position. Fish hooks 26 are attached at 27 midway of the two trolling lines 22 through the medium of leaders 28, and trolling operations may then be carried on by trolling the fish hooks 26 to and fro through the water between the shore control station and the offshore float by engaging first one reel-driving motor 29 on the shore control station and then the other to effect alternate winding in of said trolling lines.

The fishing reel 3 (or anchor reel) has a guide 30 (Fig. 3) for the fishing (or anchor) line and this guide is in the form of an eyelet and is carried beneath the reel by a bracket 31 attached to the hull of the float. The reel is journaled on a reduced forward portion 32 of a horizontal, longitudinal shaft 33, the latter in turn being journaled within a suitable bearing bracket 34 integral with the float casing 35 which is hollow and watertight. The reel hub is arranged between a flange 36 on the shaft and a friction disk 37, desirably composed of fibre, and the reduced portion 32 of the shaft is threaded at 38 to receive an adjusting nut 39 whereby the disk may be adjusted relative to the face of the reel hub frictionally to connect the reel to the shaft 33. This friction clutch may be set to slip upon overload to reduce the possibility of breakage of the line wound on the reel. The motor 7 is desirably a conventional electric motor embodying a self-contained speed reducing unit 41 and drives a sprocket 42 suitably fixed to the motor shaft. This sprocket is connected by an endless drive chain 43 to a sprocket 44 coaxial with and rotatable relative to the shaft 33. The solenoid 6 may be actuated to operate a shifter device 45 for a clutch 46 for connecting the sprocket 44 to the shaft 33 for driving the reel. The motor 7 is reversible so that the line on the reel may be wound in or payed out as desired.

The float casing is mounted on pairs of front and rear wheels 48 so that the float may travel over the ground and into and out of the water and the float may thus be manually towed or pushed. Evidently, if desired, the float casing may be mounted on self-propelling and steering means in any well-known manner.

The driving motors 8 for the propellers 9 also may be of the conventional reversible electric type having their shafts coupled at 50 (Fig. 5) to horizontal, longitudinal shafts 51 suitably journaled within bearing members 52 attached at 53 to the float casing. These shafts pass outwardly through stuffing boxes 54 and the propellers 9 are fixed to the rearward ends of the shafts. A screenlike guard 55 is attached to the rear end of the float and encloses the propellers 9 for protecting the latter in an obvious manner.

The chumming device or bait spreader 10 serves to throw out bait and comprises a bowl-like member or pan 57 having its hub 58 attached at 59 to the upper portion of a vertical shaft 60 (Fig. 3). This vertical shaft is suitably journaled within a bearing support 61 secured to a detachable top cover 62 of the float casing. This shaft passes through a stuffing box 63. A conventional motor 64, desirably an electric motor, has a self-contained speed reducing unit 65 and drives the vertical shaft 60. The bowl 57 has a cover 66 held loosely in position on the bowl hub 58 by spring pressed detents 67. This cover has finger holes 68 whereby it may be readily detached to permit filling of the bowl with loose or granular bait. When the bowl of the chumming device is rapidly rotated by the motor 64, the cover will tilt sufficiently, as indicated by dotted lines in Fig. 3, to permit the bait to be thrown out by centrifugal action through the clearance space along the rim of the bowl so that the bait is scattered over a large area in the water about the float, thus to attract fish to the vicinity of the float.

The switch 13 (Figs. 3 and 4) is actuated by a cam 70 secured to a collar 71 attached as by a screw 72 to the rotatable drive shaft 33. The switch comprises a spring finger 73 actuated by the cam and intermittently engageable with a suitable contact element 74.

Now again referring to the shore control station 2, it will be noted that the driving motor 17 for the reel 15 has a self-contained speed reducing unit 76 (Fig. 6) which drives through spur reduction gearing 77, the reel 15 on which the power conductor and control cable 16 is wound. The motor 17 is desirably of the conventional reversible electric type whereby the reel may be driven in either of opposite directions to wind in or pay out the cable, as desired. The reel motor 17 is carried by a vertically swinging frame 78 pivoted at 79 and having a leverlike handle 80. A spring pressed detent 81 is insertable in one or the other of spaced apertures 82 to hold the swingable frame 78 in either of its adjusted positions to bring the spur gearing 77 into and out of mesh. Thus, by swinging the spur pinion on the frame 78 out of mesh with the large spur gear, the drive between the motor 17 and the reel may be interrupted.

The driving motors 29 for the trolling reels 21 are likewise of the reversible electric type and have self-contained speed reducing units 84 for driving the reel shafts 85 on which the reels are journaled. The reels are arranged on transverse axes at the sides of the station-frame, parallel with axes of the motors. Like the reel 3 of the offshore unit, friction clutches 86 may be adjustably loaded to connect the reels 21 to their respective drive shafts. These friction clutches here, too, may be adjusted to slip upon overload to reduce the possibility of breakage of the trolling lines. The power conductor and control cable 16 is extended from the reel 15 of the shore control station to the offshore float and carries a plug element 87 of a connector plug 88 (Figs. 3 and 5). This connector plug is of watertight construction and is readily detachable.

Figure 2:
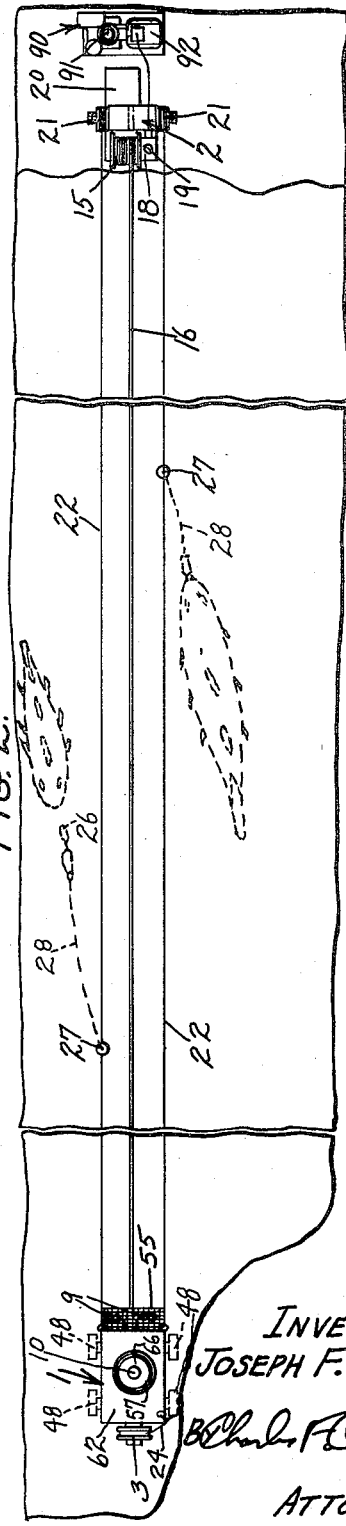

Located in adjacency to the shore control station is a portable power generator unit generally designated 90 (Figs. 1 and 2), comprising a gasoline engine 91 which drives an electric generator 92 for supplying electric power to the apparatus. If desired, however, the apparatus may derive its power medium from other convenient sources.

As shown diagrammatically in Fig. 8, the positive and negative power lines are respectively designated 93 and 94 and wires 95 and 96 leading from these power lines are connected in the circuits 97 of the motors 29 of the trolling reels 21 under the control of push-button switches 98 and 99. When one push-button is operated, one reel is driven in winding direction and the other reel may concurrently revolve in unwinding direction, so that when one trolling line is wound in, the other line may be payed out, thus to move the trolling hooks 26 back and forth through the expanse of water between the shore control station and the offshore float. By operating the other switch the other motor will, of course, be driven. A reversing controller for the reel motor 17 is designated 100 and is connected to the cable 16 through conventional slip rings 101. The switch for the lights 11 of the offshore unit is designated 102, the cable reel switch is designated 103, switches for the propeller driving motors 8 are designated 104 and 105, and the push-button switch for the chum motor 65 is designated 106. A switch 107 controls the solenoid 6 which actuates the clutch 46 for the reel 3 of the offshore unit.

When it is desired to effect offshore fishing from a station at the water's edge, the shore control station 2 may be suitably located near the edge of the waters over which the offshore float is to be operated. The float or buoyant offshore unit 1 of the apparatus should then be located on the shore convenient to the water's edge and suitable leaders, sinkers, hooks and lure should be attached to the fishing line 4 wound upon the reel 3 of the float. The power supply and control cable 16 of the reel 15 of the control station should then be attached to the float by the connector plug 88 and at this point of the operation, the switch 107 for controlling the operation of the solenoid clutch 46 should be closed so as to keep the reel 3 from revolving in unwinding direction until the float has reached the point on the water where fishing operations are to be carried on. The float may then be wheeled to the water's edge and cast off by pushing the float into the water. When the offshore unit is set afloat the propeller driving and steering motors 8 may be started by means of the control switches 104 and 105 of the shore control station. The offshore float may be directed to the desired point by operating either one or both of the propelling motors to effect steering and propelling of the unit in the proper direction. For instance, if it is desired to change the course of the float to the right, the right-hand motor 8 is stopped by disconnecting its switch, in which case the left-hand motor only propels the float causing it to turn to the right. If it is desired to turn the course of the float to the left, the opposite procedure is employed. When the offshore float has been thus caused to reach the desired location for fishing in relatively deep water at a substantial distance from the shore, the lure on the fishing line 4 may be lowered to the bottom by disengaging the solenoid clutch 46 under the control of the switch 107 to set the reel 3 into free-wheeling, thus allowing the weight of the sinker and line to pull the line to the bottom. The distance to the bottom will be indicated by the flashing of the signal light 19 on the shore control station, one flash for each revolution of the reel. When the lure is bottomed, it should then be lifted slightly off the bottom through the engagement of the solenoid clutch 46 and the setting in motion of the reel motor 7 in the proper direction by use of the reel control switch located on the shore control station.

When the offshore float is properly located and the lure is in the proper position from the bottom, everything is in waiting for the strike of a fish and the chumming device 10 may be operated to throw out bait in the water surrounding the float to attract the fish to the vicinity of the float. When the fish strikes, the line 4 will be pulled out from the reel and the amount of line pulled out may be indicated by the flashes of the signal light 19 on the shore control station. The habit of fish when it strikes, in most every case, is to swim with the lure some distance before swallowing it, and then pause. It is at this instant that the reel winding motor 7 should be set in operation for the purpose of setting the hook and winding the fish in. In the case of large, ferocious, hard-fighting fish the offshore float will disappear under the water and be carried a considerable distance. However, the winding motor 7 is left in operation to prevent slack occurring in the line and thus prevent an opportunity for the fish to throw the hook. An experienced fisherman well known that a slack line usually means a lost fish. When the reel's winding indicator indicates the fish is being retrieved and is yielding to the pull of the line, the motor 17 driving the cable reel 15 is set in operation for the purpose of bringing the float and the attached fish to shore. In the case of a hard-fighting fish and by reason of the slip clutch 37 through which the reel 4 is conected to the motor-driven shaft 33, the fish may be pulling line out although the motor is running in a winding direction. Under such a situation, the most ferocious fish soon tires out and may be brought to shore without difficulty.

When the offshore float is employed as an anchoring point for the trolling lines 22, the anchor line 24 may be substituted for the fishing line 4 of the reel 3 and the reel may be operated to lower the anchor to the bottom. With the offshore float thus anchored, the motors 29 for driving the trolling reels 21 may be operated under the control of the push-button switches 98 and 99 to move the lures of the trolling lines to and fro across the water between the shore control station and the offshore float simply by reversing the driving motors and when a fish strikes during trolling, the trolling lines may be controlled by these trolling reels in a manner similar to the fishing reel 3 above described.

As a result of this invention an improved fishing apparatus is provided by means of which fishing may be effected at points remote from the shore, far beyond the normal casting range from the water's edge, and yet wholly controlled from the shore. By the provision of the control station on the shore and the self-propelled offshore float, it is possible to fish in relatively deep water far out from the shore over a relatively wide range while still retaining control of the fishing line from the shore station. The offshore float with its self-propelling and steering means which may be controlled from the shore control station may carry the fishing line far out into the water and by the provision of the novel signaling means it is possible to determine the height of the lure from the bottom and the length of the fishing line being payed out during the fishing operation. The apparatus, due to its novel design, possesses a high degree of portability and compactness, it being possible to transport the entire apparatus in the trunk of most any conventional automobile. Power for the operation of the apparatus may be from any commercial lighting circuit and for operations remote from such power supply, the small portable gasoline driven electric generator will supply ample power. By the provision of the improved offshore anchor for the trolling lines the latter may be moved to and fro by means of trolling reels located at the shore control station. The apparatus is not only compact and readily transportable but is also relatively simple and rugged in design, well adapted for its intended purpose. Other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a fishing apparatus, the combination comprising an offshore float for a fishing line, a shore control station, a reversible motor driven reel on said float and on which a line is wound, flexible means extending between said float and said control station and operated from the latter for controlling the reversible motor drive of said reel for effecting winding in and paying out of said line independently of movement of said float, and reeling means for said flexible means for paying out the latter to permit advance of said float and for winding in said flexible means for towing said float rearwardly.

2. A fishing apparatus as set forth in claim 1 wherein said line wound upon said reel is an anchor line and is attached to an anchor for said float for anchoring the latter in a body of water, and said control means at the shore station may effect control of the lowering and raising of said anchor independently of movement of said float.

3. In combination, a reel on which a line is wound, motor driving means for said reel, a self-propelled buoyant unit movable over the waters being fished and by which said reel is carried, a shore control station, and a flexible control line distinct from said first mentioned line extending between said buoyant unit and said control station for controlling said motor driving means to effect winding in and paying out of said first mentioned line regardless of movement of said buoyant unit.

4. In combination, an offshore float movable over the waters being fished, a reel mounted on said float and on which a line is wound, a shore control station, a flexible power line distinct from said first mentioned line extending between said float and said control station, a motor on said float for driving said reel to wind in and pay out said line regardless of movement of said float and deriving its power from said power line, and reeling means for said flexible means for paying out the latter to permit advance of said float and for winding in said flexible means for towing said float rearwardly.

5. In combination, a fishing float carrying a reel on which a line is wound and supported by wheels adapted to travel over the ground, propelling and steering means for said float for propelling and steering the same while floating on the water of the area being fished independently of said ground-wheels, and a shore control station for controlling said propelling and steering means from the shore and including a flexible control element extending between said float and said control station, said control station including winding means distinct from said reel for winding in said control element to move said float either forwardly or rearwardly over the water independently of said propelling and steering means and to tow said float rearwardly over the ground while supported by said wheels.

6. In combination, an offshore fishing float having a reel on which a line is wound and adapted to ride upon the water being fished and having motor operated means carried thereby, a shore control station, and a flexible power conductor element extending between said float and said control station, said control station having winding means distinct from said reel for winding in said flexible power conducting element for towing in said float.

7. In a fishing apparatus, the combination comprising an offshore float having power operated propelling and steering means comprising a pair of relatively rotatable propellers arranged on parallel axes spaced equidistantly from and at opposite sides of the longitudinal median line of said float, said motor means comprises separate motors one individual to the drive for each propeller, and remote control means including means for separately controlling the speeds of said motors whereby said float may be steered from a remote point.

8. In a fishing apparatus, the combination comprising an offshore float carrying a power operated reel for a fishing line and having power operated propelling and steering means, said propelling and steering means including motor operated driving means carried by said float comprising a pair of relatively rotatable propellers arranged on parallel axes spaced equidistantly from and at opposite sides of the longitudinal median line of said float and separate motors one individual to the drive for each propeller, a shore control station, a flexible power conductor extending from said control station to said float for conducting motive power to said reel and said steering and propelling motors, and control means at said control station for controlling said propelling and steering means and said reel whereby the path of movement of said float may be directionally controlled and said reel may be independently operated to pay out or wind in said line as desired, said control means being operable to control said motor operated driving means, and including means for separately controlling the speeds of said motors.

9. In a fishing apparatus, the combination comprising an offshore float for a fishing line, a shore control station, a motor driven reel on said float and on which a fishing line is wound, means extending between said float and said control station and operated from the latter for controlling the drive of said reel for effecting winding in and paying out of said line independently of movement of said float, and indicator means at said shore control station for indicating reel rotation for determining the amount of line payed out and wound in by said reel.

10. In combination, an offshore float, a shore control station, reeling means at said control station, a trolling line extending between said float and said control station and wound on said reeling means, said reeling means comprising a pair of reels on which portions of said trolling line are respectively wound and means for rotating said reels to wind in one line portion while the other line portion is simultaneously payed out from its reel thereby to effect to-and-fro movements of said line portions relative to said float, and means at said control station for controlling the movements of said float.

11. In a fishing apparatus, the combination comprising an off-shore float having a power operated reel for a fishing line and power operated propelling and steering means, a shore control station, separately operable power means for driving said reel and said propelling and steering means, a flexible power conductor extending from said control station to said float for conducting motive power to said power driving means for said reel and said steering and propelling means, said control station having a reel for said power conductor, and control means at said control station for controlling said power driving means for said propelling and steering means and said reel for independently directionally controlling the path of movement of said float and for operating said reel to pay out or wind in said fishing line as desired.

12. In a fishing apparatus, a float, means controllable from a remote station for directionally controlling said float whereby the latter may traverse the area of the waters being fished, a power operated fishing reel on said float having a fishing line wound thereon, power driving means for said reel, means controllable from said remote station for controlling said power driving means for said reel to effect winding in or paying out of said fishing line at will regardless of movement of said float, means for propelling said float, and means located at said remote station and operatively connected to said float for retracting said float independently of said propelling means and said reel.

References Cited in the file of this patent

UNITED STATES PATENTS

| | | |
|---|---|---|
| 1,850,296 | Vermeulen | Mar. 22, 1932 |
| 2,243,896 | Cupples | June 3, 1941 |
| 2,457,075 | Williams | Dec. 21, 1948 |
| 2,470,507 | Luton et al. | May 17, 1949 |
| 2,582,015 | Duncan | Jan. 8, 1952 |
| 2,655,757 | Boyce | Oct. 20, 1953 |
| 2,709,316 | McCabe | May 31, 1955 |

FOREIGN PATENTS

| | | |
|---|---|---|
| 268 | Great Britain | A.D. 1897 |